J. C. GURLEY.
AUXILIARY SEAT FOR AUTOMOBILES.
APPLICATION FILED JAN. 25, 1916.
1,223,272. Patented Apr. 17, 1917.
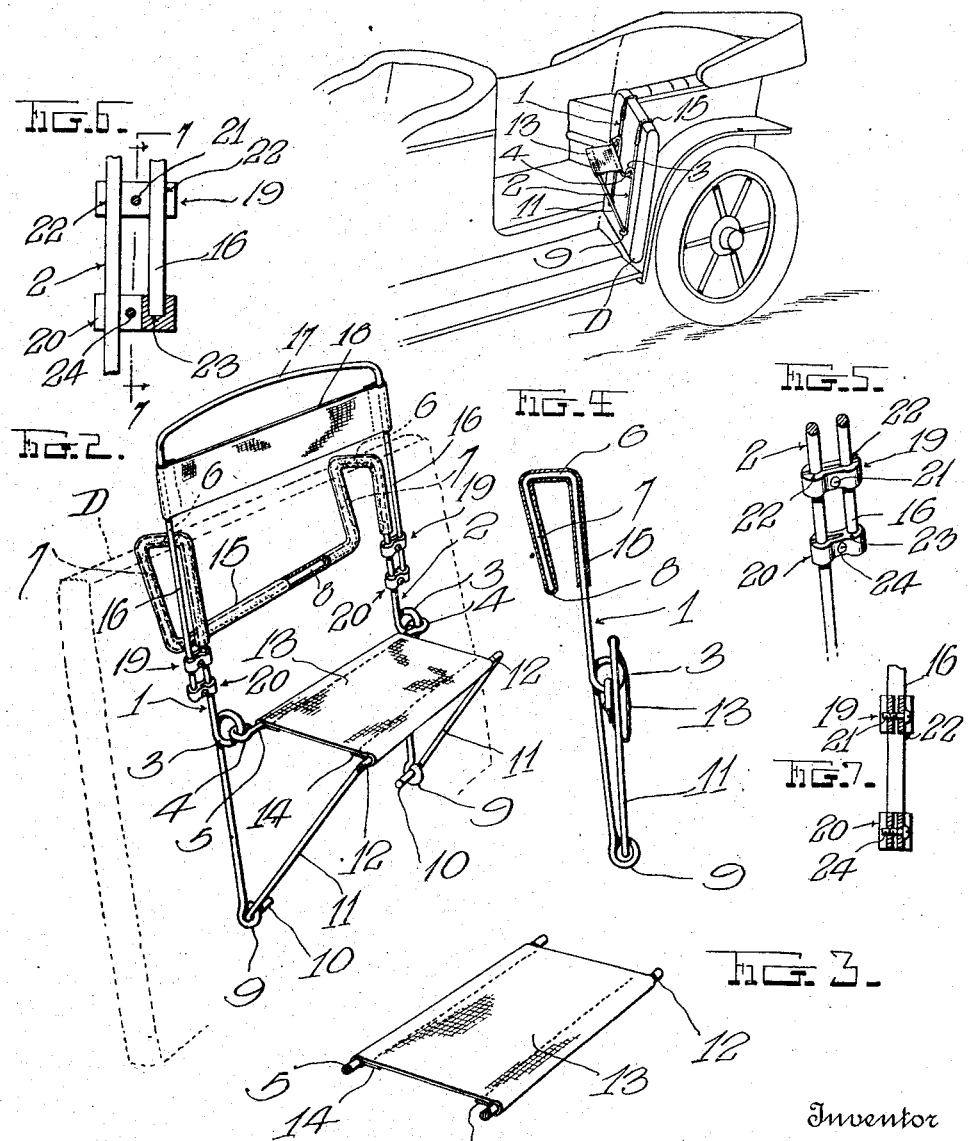
Witnesses
H. Woodard
Inventor
J. C. Gurley
by H. B. Willson & Co.
Attorneys

UNITED STATES PATENT OFFICE.

JAMES C. GURLEY, OF NORFOLK, VIRGINIA.

AUXILIARY SEAT FOR AUTOMOBILES.

1,223,272.  Specification of Letters Patent.  Patented Apr. 17, 1917.

Application filed January 25, 1916. Serial No. 74,202.

*To all whom it may concern:*

Be it known that I, JAMES C. GURLEY, a citizen of the United States, residing at Norfolk, in the county of Norfolk and State of Virginia, have invented certain new and useful Improvements in Auxiliary Seats for Automobiles; and I do declare the following to be a full, clear, and exact description of the invention, such as will enable others skilled in the art to which it appertains to make and use the same.

This invention relates to certain new and useful improvements in seats.

One object of the invention is to provide a foldable seat which is particularly intended as an auxiliary seat for automobiles and other vehicles.

Another object of the invention is to provide a device of this character which will be simple, strong, durable and inexpensive to manufacture, efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings in which similar reference numerals designate like parts throughout the several views:

Figure 1 is a perspective view of the interior of an automobile showing a device constructed in accordance with this invention applied to use;

Fig. 2 is an enlarged perspective view of the device, showing the door of the automobile in dotted lines;

Fig. 3 is a similar view of the seat portion detached; and

Fig. 4 is a side elevation of the device showing the seat in folded position, the rubber covering being shown in section.

Fig. 5 is a detail perspective view of the clamping devices for the back attachment;

Fig. 6 is a vertical sectional view through the same,

Fig. 7 is a detail section on the line 7—7 of Fig. 6.

Referring more particularly to the drawings, a framework is shown composed of parallel side bars 1 and 2 which are made of any suitable material, but preferably as here shown of round metal rods or heavy wire. These bars 1 and 2 are bent substantially midway their ends to form loops 3 around which are bent, as at 4, the extremities of a round transverse bar 5.

The upper ends of the side bars 1 and 2 are bent rearwardly as at 6 and then downwardly, and these rearwardly extending portions 7 are integrally connected at their lower ends by a transverse bar 8. The bar 8 and downwardly extending portions 7 form a hanging means, the purpose of which will be hereinafter described.

The lower ends of the side bars 1 and 2 are shaped to form eyes 9 through which extend the inwardly bent portions 10 of a pair of round oblique brace bars 11, thus pivoting the latter to said side bars. Integrally connected with the upper ends of the brace bars 11 is a cross bar 12.

Disposed between the side bars 1 and 2 and the brace bars 11 is a seat 13, here shown as made of canvas. However, it is to be understood that the seat may be made of leather, wood or any other suitable material. If canvas is desired to be used for the seat 13, the ends thereof are provided with hems 14 which receive the aforementioned transverse bar 5 and the cross bar 12, as will be readily understood.

In the drawings, the device is shown applied to use as an auxiliary seat for automobiles, the downwardly extending portions 7 and the transverse bar 8 being secured or clamped over the door D of the same, these parts being covered with rubber, felt, or any other suitable material 15 to prevent scratching of the door. Owing to the fact that the door D is disposed slightly in an oblique position, the seat will be retained in its closed position and also in its opened position by the weight of the brace bars 11 and the cross bar 12, as will be understood without further description.

In Figs. 2, 5, 6 and 7 I have illustrated a back rest or extension back which I may use in connection with the seat and the same consists of an inverted U-shaped member made of heavy wire or rod having two straight arms 16 united by a longitudinally curved connecting portion 17 and also by a strip of canvas, leather or other flexible material 18 as clearly shown in Fig. 2. This extension back rest is readily detachable by providing on the side bars 1, 2, braces 19 and brackets 20, each of the former consisting of two spaced clamp plates united by a binding screw or bolt 21 which is centrally arranged between the ends of said plates.

The ends of said clamp plates have opposing grooves forming substantially vertical apertures 22 one of which receives one of the side bars, 1, 2, while the other receives one of the back rest arms 16.

Each of the brackets 20 has a socket on its upper side with a closed bottom as shown at 23 adapted to receive one of the arms 16 and to support and limit its downward movement while the other end of the bracket 20 has spaced clamping members which are drawn together on one of the side bars 1 or 2 by a binding screw or nut 24. It will be seen that the braces 19 prevent angular displacement of the arms 16 and will frictionally bind the same to prevent their casual disengagement but at the same time the extension back rest may be readily applied or removed by merely pressing the arms 16 into the braces 19 and brackets 20 or pulling them out of the same.

One improved feature of the invention is that by raising the brackets 20, the back of the seat may be adjusted for persons of different size and by adjusting the clamps 19, the tension or resiliency of the arms 16 may be varied. Another highly advantageous characteristic of the device is that the laterally bent lower ends 10 of the braces 11 are not only mounted rotatably but slidably in the eyes or loops 9. This permits the two braces 11 to be sprung outwardly when in the position shown in Fig. 4 and thus allows them to be positioned behind the loops 4 of rod 5. This will hold the entire device in a collapsed position and thus no other latching means is necessary.

While the device is shown applied as an auxiliary seat for automobiles, it is to be understood that it may be used for numerous other purposes.

From the foregoing description taken in connection with the accompanying drawings, the operation of the invention will be fully understood without a more extended explanation.

However, it is also to be understood that the drawings are merely illustrative of the invention, and as various minor changes in form and proportion may be resorted to without departing from the spirit of the invention, I do not wish to be limited to this construction other than that set forth in the appended claims.

I claim:—

1. The combination with a chair including a pair of side bars rising from its seat; of a pair of brackets extending laterally from said side bars above the seat, a pair of resilient back rods rising from said brackets and connected at their upper ends by a back rest, and a pair of clamps securing said resilient back rods to said side bars, said clamps being adjustable vertically to vary the amount which said rods are permitted to yield.

2. A collapsible chair comprising a pair of spaced vertical side bars each having a loop at its lower end and another loop spaced above said end, all of said loops projecting forwardly from the bars, a rear seat supporting bar extending between said side bars and having loops at its ends interengaging the upper loops thereof, a front seat supporting bar having its ends bent downwardly to form inclined braces whose lower ends are bent laterally inward and received slidably and rotatably in the lower loops of the side bars, and a flexible seat secured at its front and rear edges to said seat supporting bars, said front seat supporting bar being of a length to dispose its downwardly bent ends on the outer sides of the upper loops of the side bars when the chair is collapsed.

In testimony whereof I have hereunto set my hand in presence of two subscribing witnesses.

JAMES C. GURLEY.

Witnesses:
J. A. GRISBAUER,
L. O. HILTON.

Copies of this patent may be obtained for five cents each, by addressing the "Commissioner of Patents, Washington, D. C."